United States Patent
Sawamura et al.

(10) Patent No.: US 10,718,679 B2
(45) Date of Patent: Jul. 21, 2020

(54) MEASUREMENT FLUCTUATION SUPPRESSING PRESSURE SENSOR DEVICE

(71) Applicant: Hokuriku Electric Industry Co., Ltd., Toyama-shi, Toyama (JP)

(72) Inventors: Hiroyuki Sawamura, Toyama (JP); Toshiaki Ichii, Toyama (JP)

(73) Assignee: HOKURIKU ELECTRIC INDUSTRY CO., LTD., Toyama-Shi (JP)

( * ) Notice: Subject to any disclaimer, the term of this patent is extended or adjusted under 35 U.S.C. 154(b) by 149 days.

(21) Appl. No.: 16/095,964

(22) PCT Filed: Apr. 26, 2017

(86) PCT No.: PCT/JP2017/016634
§ 371 (c)(1),
(2) Date: Oct. 24, 2018

(87) PCT Pub. No.: WO2017/188351
PCT Pub. Date: Nov. 2, 2017

(65) Prior Publication Data
US 2019/0137351 A1    May 9, 2019

(30) Foreign Application Priority Data

Apr. 27, 2016 (JP) ................. 2016-088952

(51) Int. Cl.
*G01L 9/02* (2006.01)
*G01L 19/14* (2006.01)
(Continued)

(52) U.S. Cl.
CPC ............ *G01L 9/025* (2013.01); *G01L 9/0042* (2013.01); *G01L 19/0038* (2013.01);
(Continued)

(58) Field of Classification Search
None
See application file for complete search history.

(56) References Cited

U.S. PATENT DOCUMENTS 4,483,195 A * 11/1984 Brown ................. G01L 11/00
73/112.01
4,595,342 A * 6/1986 Christlieb ........... F04D 15/0209
417/43

(Continued)

FOREIGN PATENT DOCUMENTS

EP    0409213 A2 *  1/1991 ........... G01L 1/2281
JP    01-280232    11/1989
(Continued)

OTHER PUBLICATIONS

International Search Report, dated May 30, 2017 (May 30, 2017), 2 Pages.

*Primary Examiner* — Andre J Allen
(74) *Attorney, Agent, or Firm* — Rankin, Hill & Clark LLP

(57) ABSTRACT

A pressure sensor device with good temperature characteristics. An auxiliary fluid introduction path is provided in a bottom wall portion of a first case to introduce a fluid to the vicinity of a recessed portion of the bottom wall portion where an integrated circuit with a large change in temperature characteristics is mounted such that the temperature of the integrated circuit becomes the same as or close to the temperature of the fluid.

12 Claims, 3 Drawing Sheets

(51) Int. Cl.
   *G01L 19/04* (2006.01)
   *G01L 9/00* (2006.01)
   *G01L 19/00* (2006.01)
   *G01L 19/06* (2006.01)

(52) U.S. Cl.
   CPC .......... *G01L 19/04* (2013.01); *G01L 19/0627* (2013.01); *G01L 19/143* (2013.01); *G01L 19/148* (2013.01)

(56) References Cited

U.S. PATENT DOCUMENTS

| | | | |
|---|---|---|---|
| 4,772,132 A * | 9/1988 | Hofmann | G01K 13/02 |
| | | | 374/143 |
| 4,850,227 A | 7/1989 | Luettgen et al. | |
| 5,616,521 A | 4/1997 | Cook, Sr. et al. | |
| 6,439,058 B1 | 8/2002 | Aratani et al. | |
| 7,162,927 B1 | 1/2007 | Selvan et al. | |
| 9,632,105 B2 * | 4/2017 | Yoshiuchi | B81C 1/00238 |
| 2014/0041457 A1 * | 2/2014 | Kurtz | G01L 9/06 |
| | | | 73/707 |

FOREIGN PATENT DOCUMENTS

| | | |
|---|---|---|
| JP | 09-026371 | 1/1997 |
| JP | 4281178 | 3/2009 |
| JP | 2010-256187 | 11/2010 |

\* cited by examiner

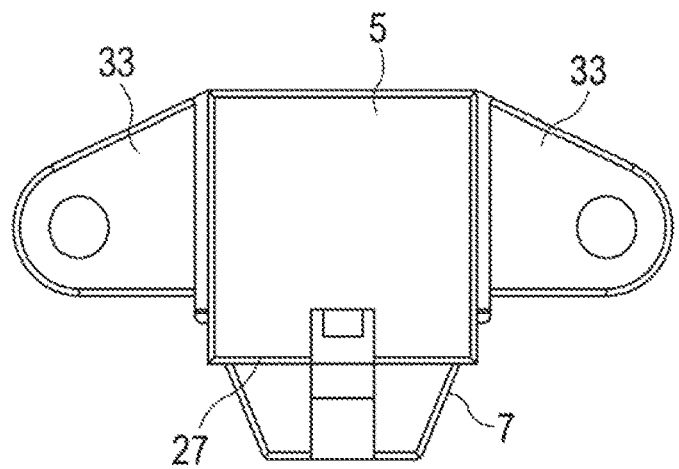
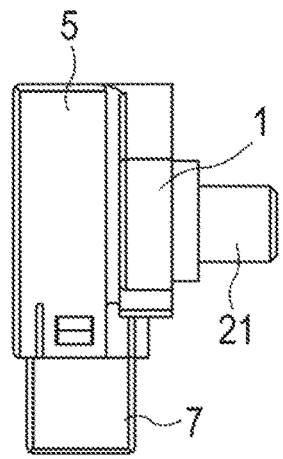
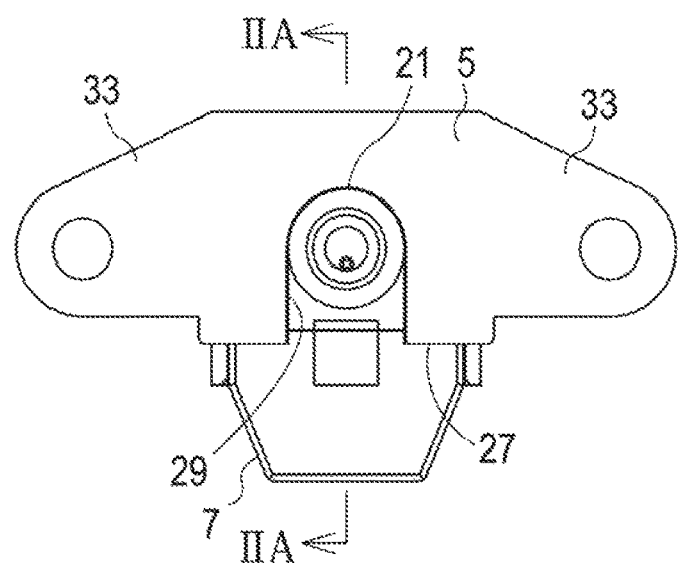
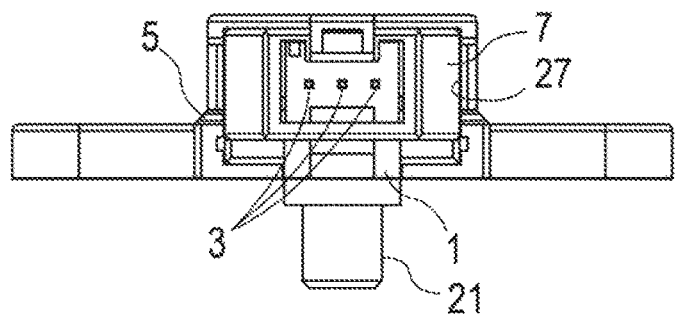

MEASUREMENT FLUCTUATION SUPPRESSING PRESSURE SENSOR DEVICE

TECHNICAL FIELD

The present invention relates to a pressure sensor device capable of suppressing fluctuations in measurement precision due to the difference in temperature of a fluid to be subjected to pressure measurement.

BACKGROUND ART

FIG. 3 is an exploded perspective view of a conventional semiconductor pressure sensor device illustrated in FIG. 1 of Japanese Patent No. 4281178 (Patent Document 1). FIG. 4 is a sectional view of the conventional semiconductor pressure sensor device illustrated in FIG. 2 of Patent Document 1. The conventional semiconductor pressure sensor device includes a first case 20, leads 30, a second case 40, and a surrounding portion 42. The first case 20 is molded from a resin. A sensor element constituted of a semiconductor is disposed in the first case 20. The leads 30 are insert-molded in the first case 20 such that the leads 30 are partially exposed from the first case 20, and exposed portions thereof are electrically connected to the sensor element. The second case 40 is assembled with the first case 20 to cover the sensor element. The surrounding portion 42 is formed on the second case 40 to surround the exposed portions of the leads 30. The exposed portions of the leads 30 and the surrounding portion constitute a connector portion that enables the exposed portions of the leads 30 to be connected to external terminals. The first case 20 and the second case 40 slide to fit with each other. An engagement structure (25, 47) is provided between the first case 20 and the second case 40 for preventing disengagement of the first and second cases. The first case 20 is integrally provided with a cylindrical body 21 into which a fluid to be measured flows.

As illustrated in FIG. 4, the sensor case 20 has an opening portion 20a on one side thereof. A sensor element 10 etc. is disposed in the opening portion 20a. The sensor case 20 also has a pressure introduction port 21 configured to project toward the opposite side from the bottom surface of the opening portion 20a. The distal end portion of the pressure introduction port 21 is mountable at an appropriate location of a flow path in a hot water supply device via an O-ring or the like. An introduction hole 22 is provided inside the pressure introduction port 21 to introduce a pressure from the flow path.

The bottom surface of the opening portion 20a of the sensor case 20 is formed with a recessed portion 23 recessed from a flat portion of the bottom surface. The sensor element 10 is fixed in the recessed portion 23 via a base 11 made of glass or the like. The sensor element 10 is configured such that a plurality of diffused resistors are formed on a diaphragm made of a semiconductor material (e.g. monocrystalline silicon) having a piezoresistance effect and connected to each other by bridge connection, although not illustrated. Variations in resistance value of the diffused resistors according to deformation of the diaphragm are taken out from the bridge circuit as an electrical signal.

The sensor element 10 and the base 11 are bonded to each other by glass bonding or the like. A through hole that communicates with the introduction hole 22 is formed inside the base 11. A pressure from the flow path is transmitted from the introduction hole 22 to the diaphragm of the sensor element 10 through the through hole of the base 11. The recessed portion 23 is filled with a sealing agent 24 in order to enhance the air-tightness between the through hole of the glass base 11 and the introduction hole 22.

A bipolar transistor element 12 and a MOS transistor element 13 are fixed in the opening portion 20a of the sensor case 20 by an adhesive or the like. The bipolar transistor element 12 serves as an amplification circuit operable to amplify an output signal from the sensor element 10. The MOS transistor element 13 serves as an adjustment circuit operable to adjust the output signal from the sensor element 10, a signal from the bipolar transistor element 12, etc.

The sensor element 10, the bipolar transistor element 12, the MOS transistor element 13, and the leads 30 are electrically connected to each other, as appropriate, by a plurality of wires 14 formed by wire bonding and made of gold, aluminum, or the like. The electrical signal (output) from the sensor element 10 is taken out from each of the elements 12 and 13, the leads 30, and exposed portions 31 of the leads 30 through the wires 14.

RELATED-ART DOCUMENT

Patent Document

Patent Document 1: Japanese Patent No. 4281178 (FIGS. 1 and 2)

SUMMARY OF INVENTION

Technical Problem

In the conventional semiconductor pressure sensor device of Patent Document 1, the bipolar transistor element 12, which serves as an amplification circuit operable to amplify an output signal from the sensor element 10, and the MOS transistor element 13, which serves as an adjustment circuit operable to adjust the output signal from the sensor element 10 and a signal from the bipolar transistor element 12, etc., are disposed at positions away from the introduction hole 22 configured to introduce a pressure from the flow path. Therefore, the temperatures of the circuit elements constituting the amplification circuit and the adjustment circuit are different from the temperature of the sensor element 10 which is substantially the same as the temperature of the fluid. As a result, there is a difference between the temperature characteristics of the sensor element and the temperature characteristics of the amplification circuit and the adjustment circuit, and such a difference degrades the temperature characteristics of the pressure sensor device.

An object of the present invention is to provide a pressure sensor device with good temperature characteristics compared to the related art.

Solution to Problem

The present invention is directed to a pressure sensor device including: a pressure sensor element; an electrically insulating case provided with a main fluid introduction path and including a mounting wall portion to which the pressure sensor element is mounted such that a pressure of a fluid introduced into the case through the main fluid introduction path acts on the pressure sensor element; and one or more circuit elements operable to process an output signal from the pressure sensor element and housed in the case, being mounted to the mounting wall portion of the case. In the present invention, an auxiliary fluid introduction path is provided in the case to introduce the fluid to a vicinity of a mounting portion of the mounting wall portion where at least one specific circuit element of the one or more circuit elements is mounted such that a temperature of the at least one specific circuit element with a large change at least in temperature characteristics becomes the same as or close to a temperature of the fluid. According to the present invention, the auxiliary fluid introduction path is provided in the case to introduce the fluid to the vicinity of the mounting portion of the mounting wall portion where the at least one specific circuit element is mounted. Thus, variations in temperature of the pressure sensor element and variations in temperature of the at least one specific circuit element are substantially the same as each other. As a result, fluctuations in output of the pressure sensor device are small even if variations in temperature of the fluid are large.

The pressure sensor element may be a semiconductor pressure sensor element including a diaphragm portion on which a sensor circuit is formed and a cylindrical base portion that supports an outer peripheral portion of the diaphragm portion. In this case, the base portion is joined to the mounting wall portion of the case. The main fluid introduction path and the auxiliary fluid introduction path are formed in the mounting wall portion of the case to introduce the fluid into the base portion. With this configuration, the pressure of the fluid can be directly measured.

The auxiliary fluid introduction path is preferably formed as a flow path branched from the main fluid introduction path. With this configuration, the pressure sensor device can be reduced in size compared to when the auxiliary fluid introduction path is formed independently from the main fluid introduction path.

The auxiliary fluid introduction path preferably includes a tapered flow path portion continuous with the main fluid introduction path, whereby the transverse sectional shape of the tapered flow path portion becomes gradually smaller toward the mounting portion of the mounting wall portion. With the tapered flow path portion provided, air bubbles having entered into the auxiliary fluid introduction path can be smoothly discharged, thereby preventing degradation of the temperature transmission performance due to the presence of the air bubbles.

The mounting portion preferably has a thickness in a range of 0.5 mm±0.1 mm. The mounting portion having such a thickness can be maintained at a temperature that is the same as or close to the temperature of the fluid regardless of what insulating material is used to form the case.

Further, an internal space of the cylindrical base portion is preferably filled with oil that is resistant to alkali. If the internal space of the base portion is filled with such oil, the pressure sensor element can be protected even if an alkaline fluid enters into the main fluid introduction path. The oil may be silicone oil or fluorine oil. Such oil is not changed or aged over time, and thus filling of the oil does not reduce the life.

Preferably, a narrow flow path portion is formed at an end portion of the main fluid introduction path that communicates with the internal space of the cylindrical base portion, whereby a transverse sectional area of the narrow flow path portion is smaller than a transverse sectional area of an adjacent flow path portion in order to prevent the oil from flowing out. The presence of the narrow flow path portion can effectively prevent exposure of the oil.

A circuit substrate having a circuit mounted thereon may be housed in the case so as to perform signal processing other than signal processing performed by the at least one specific circuit element. In this case, preferably, a recessed portion is provided in the mounting wall portion of the case so as to receive the pressure sensor element; and a depth of the recessed portion, a position of the at least one specific circuit element, and a shape and a circuit pattern of the circuit substrate are determined so as to enable bonding connection between the sensor circuit of the pressure sensor element that is exposed from the recessed portion and the circuit on the circuit substrate and also between the at least one specific circuit element and the circuit on the circuit substrate. With this configuration, the device can be reduced in size even if the circuit substrate is mounted.

BRIEF DESCRIPTION OF DRAWINGS

FIGS. 1A to 1D are a plan view, a right side view, a bottom view, and a front view, respectively, of a semiconductor pressure sensor device according to an embodiment of the present invention.

DESCRIPTION OF EMBODIMENT

Figure 2A:
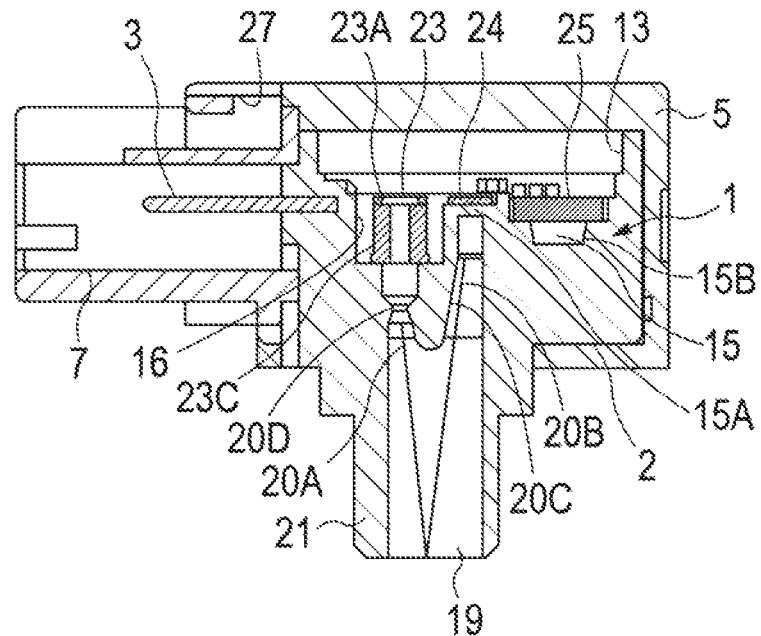
FIG. 2A is a sectional view taken along line IIA-IIA in FIG. 1C.
Figure 2B:
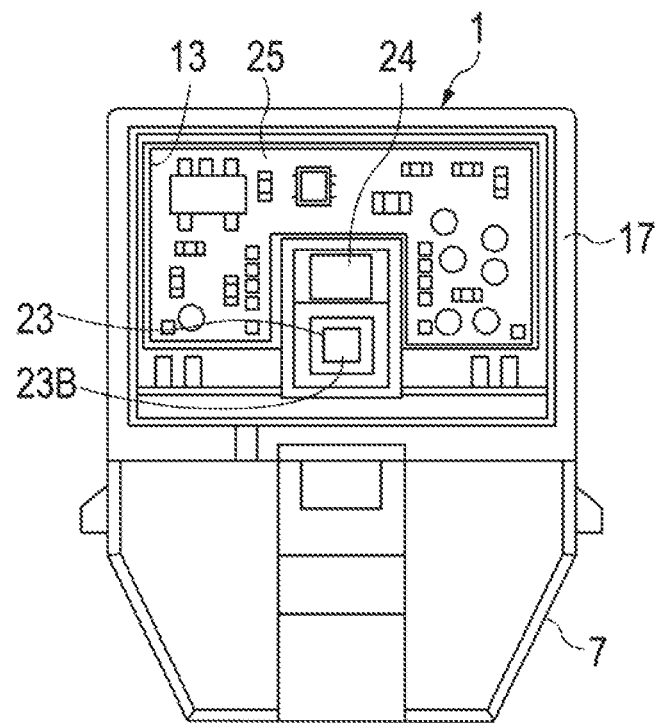
FIG. 2B is a transverse sectional view of an essential portion of the semiconductor pressure sensor device.
Figure 3:
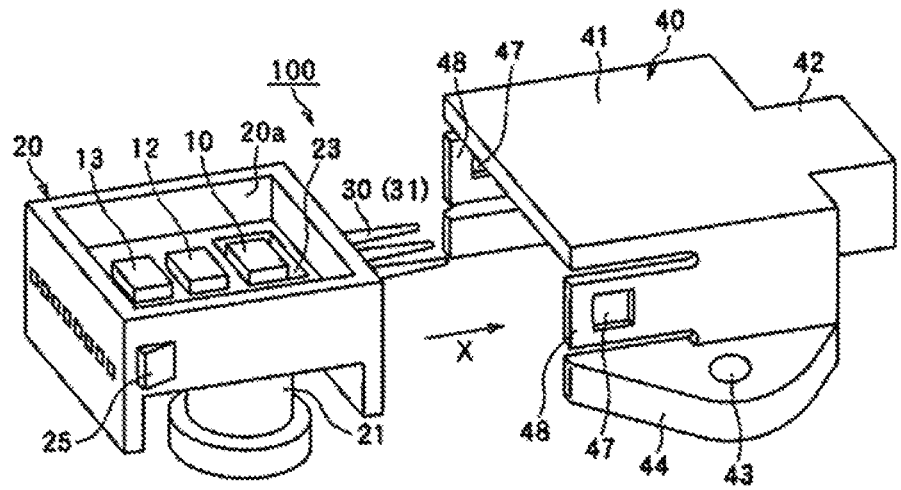
FIG. 3 is an exploded perspective view illustrating the configuration of a conventional pressure sensor device.
Figure 4:
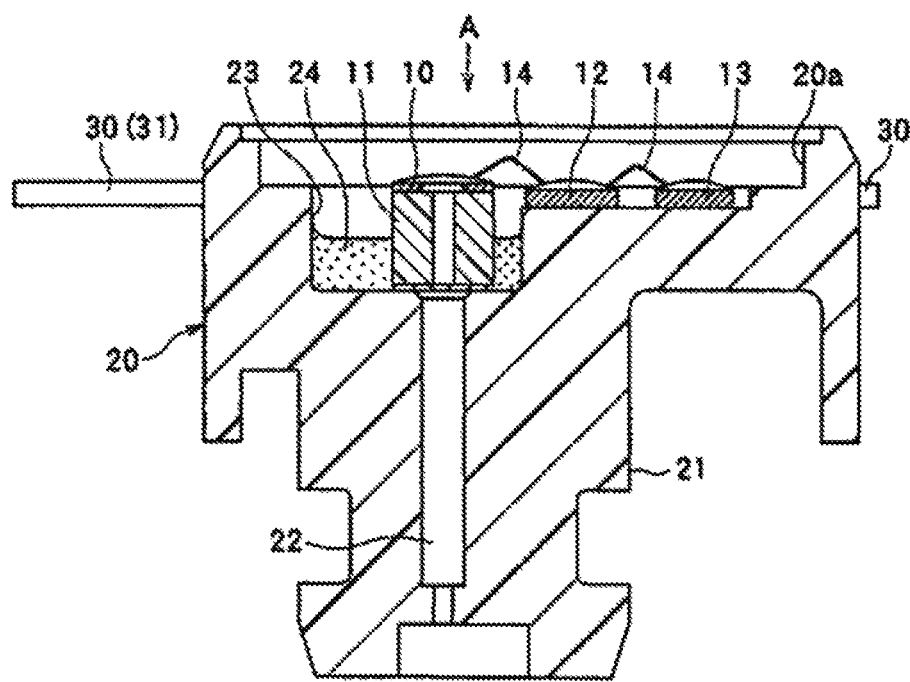
FIG. 4 is a sectional view illustrating the conventional pressure sensor device.

An embodiment in which a pressure sensor device according to the present invention is applied to a semiconductor pressure sensor device will be described below in details with reference to the drawings. FIGS. 1A to 1D are a plan view, a right side view, a bottom view, and a front view, respectively, of a semiconductor pressure sensor device according to the embodiment. FIG. 2A is a sectional view taken along line IIA-IIA in FIG. 1C. FIG. 2B is a transverse sectional view of an essential portion of the semiconductor pressure sensor device. The semiconductor pressure sensor device according to the illustrated embodiment includes a first case 1, lead terminals 3, a second case 5, and a terminal housing 7.

As illustrated in FIG. 2, the first case 1 has a rectangular parallelepiped outer shape with one open surface, and includes an opening portion 13 provided in the upper surface, a bottom wall portion 15 opposing the opening portion 13, and a peripheral wall portion 17 with four surfaces integrally provided with the bottom wall portion 15. The first case 1 further includes a cylindrical body 21 projecting in a direction away from the bottom wall portion 15 and having a pressure introduction port 19 therein. The bottom wall portion 15 is formed with a main fluid introduction path 20A and an auxiliary fluid introduction path 20B configured to communicate with the pressure introduction port 19. In the embodiment, the bottom wall portion 15 constitutes a mounting wall portion to which a semiconductor pressure sensor element 23 is mounted such that the pressure of a fluid introduced into the first case 1 through the main fluid introduction path 20A acts on the semiconductor pressure sensor element 23.

As illustrated in FIGS. 2A and 2B, the first case 1 houses the semiconductor pressure sensor element 23, an integrated circuit 24 operable to process an output signal from the semiconductor pressure sensor element 23, and a circuit substrate 25 including a power source circuit and an adjustment circuit. The integrated circuit 24 is at least one specific circuit element with a large change at least in temperature characteristics, of one or more circuit elements according to the present invention. Elements on the circuit substrate 25 are circuit elements other than the at least one specific circuit element.

The semiconductor pressure sensor element 23 includes a diaphragm portion 23A on which a sensor circuit 23B is formed, and a cylindrical base portion 23C that supports the outer peripheral portion of the diaphragm portion 23A. The semiconductor pressure sensor element 23 is housed in a recessed portion 16 provided in the bottom wall portion 15 of the first case 1, which is made of an insulating resin, such that the pressure of a fluid introduced into the first case 1 through the pressure introduction port 19 and the main fluid introduction path 20A acts on the semiconductor pressure sensor element 23 through the main fluid introduction path 20A. The base portion 23C of the semiconductor pressure sensor element 23 is joined to the bottom surface of the recessed portion 16 using an adhesive. The depth of the recessed portion 16, the position of the integrated circuit 24, and the shape and the circuit pattern of the circuit substrate 25 are determined so as to enable bonding connection between the sensor circuit 23B of the semiconductor pressure sensor element 23 that is exposed from the recessed portion 16 and the circuit on the circuit substrate 25 and also between the integrated circuit 24 and the circuit on the circuit substrate 25.

The internal space of the cylindrical base portion 23C is preferably filled with oil that is resistant to alkali. If the internal space of the base portion is filled with such oil, the semiconductor pressure sensor element 23 can be protected even if an alkaline fluid enters into the main fluid introduction path 20A. The oil may be silicone oil or fluorine oil. Such oil is not changed or aged over time, and thus filling of the oil does not reduce the life.

In the embodiment, a narrow flow path portion 20D is formed at an end portion of the main fluid introduction path 20A that communicates with the internal space of the cylindrical base portion 23C, whereby the transverse sectional area of the narrow flow path portion 20D is smaller than the transverse sectional area of an adjacent flow path portion in order to prevent the oil from flowing out. The presence of the narrow flow path portion 20D can effectively prevent exposure of the oil.

When the external pressure acts on the diaphragm portion 23A through the main fluid introduction path 20A, the semiconductor pressure sensor element 23 outputs a signal proportional to the pressure as the diaphragm is deformed to vary the resistance value of a resistance element, and variations in resistance value are detected by a resistance bridge circuit (23B).

In the embodiment, the auxiliary fluid introduction path 20B is provided in the case to introduce the fluid to the vicinity of a portion (recessed portion 16) of the bottom wall portion 15 (mounting wall portion) where the integrated circuit 24 (corresponding to the at least one specific circuit element) is mounted such that the temperature of the integrated circuit 24 with a large change in temperature characteristics becomes the same as or close to the temperature of the fluid. With the auxiliary fluid introduction path 20B provided, variations in temperature of the semiconductor pressure sensor element 23 and variations in temperature of a mounting portion 15A to which the integrated circuit 24 is mounted are substantially the same as each other. As a result, fluctuations in output of the semiconductor pressure sensor device are small even if variations in temperature of the fluid are large. In the embodiment, the auxiliary fluid introduction path 20B is formed to be branched from the main fluid introduction path 20A. That is, the auxiliary fluid introduction path 20B is not provided separately from the main fluid introduction path 20A, but provided as a flow path branched from the pressure introduction port 19. With this configuration, the pressure sensor device can be reduced in size compared to when a separate auxiliary fluid introduction path 20B is independently formed.

The mounting portion 15A preferably has a thickness in the range of 0.5 mm±0.1 mm. The mounting portion having such a thickness can be maintained at a temperature that is the same as or close to the temperature of the fluid even if the case is formed from an insulating resin material or the like. The auxiliary fluid introduction path preferably includes a tapered flow path portion continuous with the main fluid introduction path, whereby the transverse sectional shape of the tapered flow path portion becomes gradually smaller toward the mounting portion of the mounting wall portion. With the tapered flow path portion provided, air bubbles having entered into the auxiliary fluid introduction path can be smoothly discharged, thereby preventing degradation of the temperature transmission performance due to the presence of the air bubbles.

The distal end portion of the auxiliary fluid introduction path 20B according to the embodiment is formed to be substantially flat to extend along the bottom surface of the integrated circuit 24. In the embodiment, a recessed portion 15B is formed at a portion of the bottom wall portion 15 at which the circuit substrate 25 is disposed.

An example fluid to be subjected to pressure detection is water. Fluctuations in level of water in a tank, for example, can be monitored by detecting the magnitude of the pressure by disposing underwater the pressure introduction port 19 of the semiconductor pressure sensor device according to the embodiment.

An electrical signal that represents the pressure is output from the lead terminals 3. One end of each lead terminal 3 is electrically connected to a terminal electrode on the circuit substrate 25. The other end of each lead terminal 3 projects in one direction from one surface of the peripheral wall portion 17 of the first case 1.

The second case 5, which is made of an insulating resin, includes an opening portion 27 and a groove portion 29. Three lead terminals 3 extend through the opening portion 27 when the second case 5 slides to fit with the first case 1 in the direction opposite to one direction (the direction of projection of the lead terminals 3). The cylindrical body 21 of the first case 1 slides to fit with the groove portion 29. The second case 5 covers the opening portion 13 of the first case 1. That is, the inner surface of the second case 5 is formed to be complementary to the outer shape of the first case 1 except for the cylindrical body 21. With the second case 5 configured in this way, the groove portion 29 with which the cylindrical body 21 slides to fit and the wall surface of the first case 1 completely oppose each other even if the semiconductor pressure sensor is installed with the cylindrical body 21 directed upward, thereby preventing water from directly entering into the first case through the groove portion 29. Flanges 33 and 33 project from opposed side surfaces of the second case 5. The flanges 33 and 33 allow the semiconductor pressure sensor device to be attached onto a surface using bolts or screws.

The terminal housing 7, which is made of a resin, is attached to the first case 1 to surround the other end of each of the three lead terminals 3, and to form a connector portion 35 configured to enable external terminals to be connected to the other end of each of the three lead terminals 3. To this end, the terminal housing 7 is formed to constitute a connector shape according to a predetermined standard together with the other end of each of the lead terminals 3.

In the semiconductor pressure sensor device according to the embodiment, the terminal housing 7 and the second case 5 are engaged with each other via an engagement structure, and the terminal housing 7 and the first case 1 are fitted with each other via a fitting structure. As a result, most of the clearance formed between the first case 1 and the second case 5 which are fitted with each other is covered by the terminal housing 7, thereby preventing entry of water through the clearance.

Hence, in the semiconductor pressure sensor device according to the embodiment, by moving the second case 5 which houses the first case 1 in a direction toward the terminal housing 7 in the process of assembling the semiconductor pressure sensor device, the terminal housing 7 and the first case 1 are positioned with respect to each other by the fitting structure, the terminal housing 7 and the second case 5 are fixed to each other by the engagement structure at the same time, and the first case 1 and the second case 5 are fixed to each other using the terminal housing 7.

The opening portion 13 of the first case 1 may be covered by a sheet that is air permeable but not water permeable. This configuration can further enhance the waterproof property.

In the embodiment described above, a semiconductor pressure sensor device is used as the pressure sensor device. However, it is a matter of course that the present invention is also applicable when a different type of pressure sensor device is used.

INDUSTRIAL APPLICABILITY

According to the present invention, an auxiliary fluid introduction path is provided in the case to introduce the fluid to the vicinity of a portion of the mounting wall portion where at least one specific circuit element is mounted. Thus, variations in temperature of the pressure sensor element and variations in temperature of the at least one specific circuit element are substantially the same as each other. As a result, fluctuations in output of the pressure sensor device are advantageously small even if variations in temperature of the fluid are large.

DESCRIPTION OF REFERENCE NUMERALS 1 first case
3 lead terminal
5 second case
7 terminal housing
13 opening portion
15 bottom wall portion
16 recessed portion
17 sidewall portion
19 pressure introduction port
20A main fluid introduction path
20B auxiliary fluid introduction path
21 cylindrical body
23 semiconductor pressure sensor element
25 circuit substrate
27 opening portion
29 groove portion
33 flange

The invention claimed is:
1. A semiconductor pressure sensor device comprising:
a pressure sensor element;
an electrically insulating case provided with a main fluid introduction path and including a mounting wall portion to which the pressure sensor element is mounted such that a pressure of a fluid introduced into the case through the main fluid introduction path acts on the pressure sensor element; and
one or more circuit elements operable to process an output signal from the pressure sensor element and housed in the case, being mounted to the mounting wall portion of the case, wherein:
an auxiliary fluid introduction path is provided in the case to introduce the fluid to a vicinity of a mounting portion of the mounting wall portion where at least one specific circuit element of the one or more circuit elements is mounted such that a temperature of the at least one specific circuit element with a large change at least in temperature characteristics becomes the same as or close to a temperature of the fluid.

2. The semiconductor pressure sensor device according to claim 1, wherein:
the pressure sensor element is a semiconductor pressure sensor element including a diaphragm portion on which a sensor circuit is formed and a cylindrical base portion that supports an outer peripheral portion of the diaphragm portion;
the base portion is joined to the mounting wall portion of the case; and
the main fluid introduction path and the auxiliary fluid introduction path are formed in the mounting wall portion of the case to introduce the fluid, which has been introduced through a pressure introduction port, into the base portion.

3. The semiconductor pressure sensor device according to claim 2, wherein:
the auxiliary fluid introduction path is formed as a flow path branched from the main fluid introduction path.

4. The semiconductor pressure sensor device according to claim 3, wherein:
the auxiliary fluid introduction path includes a tapered flow path portion continuous with the main fluid introduction path, whereby a transverse sectional shape of the tapered flow path portion becomes gradually smaller toward the mounting portion of the mounting wall portion.

5. The semiconductor pressure sensor device according to claim 1, wherein:
the mounting portion has a thickness in a range of 0.5 mm±0.1 mm.

6. The semiconductor pressure sensor device according to claim 2, wherein:
an internal space of the cylindrical base portion is filled with oil that is resistant to alkali.

7. The semiconductor pressure sensor device according to claim 6, wherein:
the oil is silicone oil or fluorine oil.

8. The semiconductor pressure sensor device according to claim 6, wherein:
a narrow flow path portion is formed at an end portion of the main fluid introduction path that communicates with the internal space of the cylindrical base portion, whereby a transverse sectional area of the narrow flow path portion is smaller than a transverse sectional area of an adjacent flow path portion in order to prevent the oil from flowing out.

9. The semiconductor pressure sensor device according to claim 1, wherein:

a circuit substrate having a circuit mounted thereon is housed in the case so as to perform signal processing other than signal processing performed by the at least one specific circuit element;

a recessed portion is provided in the mounting wall portion of the case so as to receive the pressure sensor element; and a depth of the recessed portion, a position of the at least one specific circuit element, and a shape and a circuit pattern of the circuit substrate are determined so as to enable bonding connection between the sensor circuit of the pressure sensor element that is exposed from the recessed portion and the circuit on the circuit substrate and also between the at least one specific circuit element and the circuit on the circuit substrate.

10. The semiconductor pressure sensor device according to claim 7, wherein:

a narrow flow path portion is formed at an end portion of the main fluid introduction path that communicates with the internal space of the cylindrical base portion, whereby a transverse sectional area of the narrow flow path portion is smaller than a transverse sectional area of an adjacent flow path portion in order to prevent the oil from flowing out.

11. The semiconductor pressure sensor device according to claim 1, wherein:

a circuit substrate having a circuit mounted thereon is housed in the case so as to perform signal processing other than signal processing performed by the at least one specific circuit element;

a recessed portion is provided in the mounting wall portion of the case so as to receive the pressure sensor element; and a depth of the recessed portion, a position of the at least one specific circuit element, and a shape and a circuit pattern of the circuit substrate are determined so as to enable bonding connection between the sensor circuit of the pressure sensor element that is exposed from the recessed portion and the circuit on the circuit substrate and also between the at least one specific circuit element and the circuit on the circuit substrate.

12. The semiconductor pressure sensor device according to claim 3, wherein:

a circuit substrate having a circuit mounted thereon is housed in the case so as to perform signal processing other than signal processing performed by the at least one specific circuit element;

a recessed portion is provided in the mounting wall portion of the case so as to receive the pressure sensor element; and a depth of the recessed portion, a position of the at least one specific circuit element, and a shape and a circuit pattern of the circuit substrate are determined so as to enable bonding connection between the sensor circuit of the pressure sensor element that is exposed from the recessed portion and the circuit on the circuit substrate and also between the at least one specific circuit element and the circuit on the circuit substrate.

* * * * *